United States Patent [19]

Suzuki

[11] Patent Number: 5,594,501

[45] Date of Patent: Jan. 14, 1997

[54] ACCUMULATION TIME CONTROL APPARATUS

[75] Inventor: Kenji Suzuki, Kawasaki, Japan

[73] Assignee: Canon Kabushiki Kaisha, Tokyo, Japan

[21] Appl. No.: 317,827

[22] Filed: Oct. 4, 1994

Related U.S. Application Data

[63] Continuation of Ser. No. 24,847, Feb. 26, 1993, abandoned, which is a continuation of Ser. No. 652,998, Feb. 7, 1991, abandoned.

[30] Foreign Application Priority Data

Feb. 15, 1990 [JP] Japan ........................... 2-35232

[51] Int. Cl.$^6$ ............................................. H04N 5/235
[52] U.S. Cl. .......................... 348/362; 348/366; 396/96
[58] Field of Search .................................. 348/362, 364, 348/366; 354/402, 403, 404, 405, 406, 407, 408, 409; 250/208.1; H04N 5/232

[56] References Cited

U.S. PATENT DOCUMENTS

| | | | |
|---|---|---|---|
| 4,410,258 | 10/1983 | Aoki et al. | 354/25 |
| 4,855,776 | 8/1989 | Akashi | 354/402 |
| 4,910,548 | 3/1990 | Taniguchi et al. | 354/407 |
| 4,931,822 | 6/1990 | Yamano | 354/402 |
| 4,952,966 | 8/1990 | Ishida et al. | 354/406 |
| 4,954,701 | 9/1990 | Suzuki et al. | 250/201.8 |
| 4,979,045 | 12/1990 | Taniguchi et al. | 358/227 |

FOREIGN PATENT DOCUMENTS 0349736  1/1990  European Pat. Off. .......... G03B 3/00

Primary Examiner—John K. Peng
Assistant Examiner—Tuan V. Ho
Attorney, Agent, or Firm—Robin, Blecker, Daley & Driscoll

[57] ABSTRACT

An accumulation time control apparatus comprises a plurality of sensors and a control circuit to control charge accumulation times of the sensors, respectively, wherein on the basis of the accumulation time in either one of the sensors whose accumulation amount has first reached a predetermined level, the control circuit sets the accumulation times of the other sensors.

40 Claims, 6 Drawing Sheets

ACCUMULATION TIME CONTROL APPARATUS

This is a continuation application under 37 CFR 1.62 of prior application Ser. No. 08/024,847, filed Feb. 26, 1993, now abandoned which is a continuation of Ser. No. 07/652,998, filed Feb. 7, 1991, now abandoned.

BACKGROUND OF THE INVENTION

1. Field of the Invention

The present invention relates to an accumulation time control apparatus for sensors which are used in a focal point detecting apparatus having a plurality of distance measuring visual fields or the like.

2. Related Background Art

Hitherto, various methods of controlling an accumulation time of an AF sensor have been proposed. However, in most of the cases, there is generally used a method comprising a combination of both of a control method of terminating the accumulating operation when a charge accumulation amount has reached a predetermined signal level due to the automatic gain control (AGC) and a control method of terminating the accumulating operation when a predetermined maximum accumulation time has occurred even if a charge accumulation amount doesn't reach a predetermined signal level. A reason why two kinds of control methods are used is because a dynamic range of the luminance of an optical apparatus such as a camera or the like is extremely wide and cannot be completely controlled by one method.

The conventional known method will now be simply described hereinbelow with reference to the drawings.

FIG. 1 shows an AF optical system of the typical double image phase difference detecting type.

In FIG. 1, a field lens FLD has the same optical axis as that of a photographing lens LNS whose focal point is to be detected. Two secondary image forming lenses FCLA and FCLB are arranged at positions which are symmetrical with respect to an optical axis behind the field lens FLD. Sensor arrays SAA and SAB are arranged at positions further behind the lenses FCLA and FCLB. Diaphragms DIA and DIB are arranged near the secondary image forming lenses FCLA and FCLB. The field lens FLD forms an image of an exit pupil of the photographing lens LNS almost onto pupil surfaces of the two secondary image forming lenses FCLA and FCLB. Thus, the light fluxes which respectively enter the secondary image forming lenses FCLA and FCLB are light fluxes which were emitted from the regions having the same area which are not mutually overlapped and correspond to the secondary image forming lenses FCLA and FCLB on the exit pupil surface of the photographing lens LNS. When an air image formed at a position near the field lens FLD is again formed onto the surfaces of the sensor arrays SAA and SAB by the secondary image forming lenses FCLA and FCLB, the positions of two images on the sensor arrays SAA and SAB are changed on the basis of a deviation of the position of the air image in the direction of the optical axis. Therefore, a focal point state of the photographing lens LNS can be known by detecting a deviation amount of the relative position of two images on the sensor arrays.

FIG. 2 shows an example of photoelectric conversion outputs of two images formed on the sensor arrays SAA and SAB. The output of the SAA assumes $A(i)$ and the output of the SAB assumes $B(i)$. As the number of pixels of each sensor, at least five pixels are needed and, preferably, tens or more pixels are necessary.

As a signal processing method of detecting an image deviation amount PR from the image signals $A(i)$ and $B(i)$, applicant herein has proposed methods as disclosed in Japanese Laid-Open Patent Application No. 58-142306, Japanese Laid-Open Patent Application No. 59-107313, Japanese Laid-Open Patent Application No. 60-101513, Japanese Patent Application No. 61-160824, and the like.

The photographing lens can be set into an in-focus state by adjusting a focal point of the photographing lens on the basis of the image deviation amount obtained by the methods disclosed in the above-cited Japanese references, which have respective counterparts in U.S. Pat. No. 4,559,446, U.S. Pat. No. 4,559,446, U.S. Pat. No. 4,618,236 and U.S. Pat. No. 4,812,869.

The accumulation times of the AF sensors SAA and SAB are controlled, for example, in the following manner. In FIG. 3, control sensors SAGCA and SAGCB are arranged at positions adjacent to the sensor arrays SAA and SAB and observe almost the same object portion as the distance measuring visual field images. Outputs of the control sensors SAGCA and SAGCB are added by an adder ADD and an addition signal is supplied from the adder ADD to comparators $COMP_1$ and $COMP_2$.

A potential which is compared with the addition output by each comparator is obtained by dividing a reference potential $V_{ref}$. The comparator output potentials correspond respectively to the upper level and lower level in FIG. 4. Output signals of the comparators are always supplied to a control circuit $CONT_2$ and are referred to at a certain point in time. A control signal to control a control circuit $CONT_1$ is generated from the control circuit $CONT_2$. The control circuit $CONT_1$ receives the control signal from the control circuit $CONT_2$ and transfers and reads out the photo charges of the AF sensors to a transfer channel TRANS through a gate GATE in order to terminate the accumulation of the charges by the AF sensors. The read-out charges are supplied to an operating circuit through an amplifier of a designated gain.

The control circuit $CONT_2$ receives two kinds of time designation pulses BTIME and TMAX and executes the following operation.

When the upper comparator $COMP_1$ is turned on before the BTIME pulse arrives, that is, when an accumulation amount of the control sensor has reached the upper level in FIG. 4, the accumulation is finished at that time point and a signal is generated so as to select an amplifier of a low gain in the control circuit $CONT_1$. The output signal of the adder ADD changes in accordance with a straight line $L_1$ in FIG. 4 with the elapse of the accumulation time and the accumulation is finished at time $T_1$ before the time point of the pulse BTIME.

If the accumulation amount of the control sensor doesn't reach the upper level before the arrival of the pulse BTIME, the gain of the amplifier in the control circuit $CONT_1$ is selected in response to the pulse BTIME. That is, if the accumulation amount of the control sensor is higher than the lower level at that time point, the low gain is selected and the accumulation is continued until the accumulation amount is equal to the upper level of the comparator. The output of the adder ADD changes in accordance with the straight line $L_2$ in FIG. 4. The accumulation is finished at time $T_2$. On the other hand, if the accumulation amount is lower than the lower level, the accumulation is continued until the accumulation amount reaches the lower level as shown by a straight line $L_3$. The accumulation is finished at time $T_3$. At this time, the control circuit $CONT_2$ instructs the control circuit $CONT_1$ to use an amplifier of a high gain. A ratio of two gains is set to a value which is equal to a ratio of two comparison levels.

In the above description, it is not always necessary to use two kinds of gains. In a sensor pixel construction as shown in FIG. 5 in which an amplifying transistor is provided for each pixel of an AF sensor array, by using a double emitter construction as the above transistor and by commonly connecting one of the emitters of each transistor, the accumulation time can be controlled by using the image itself in the distance measuring visual field.

On the other hand, in recent years, there has been developed a method of automatically detecting a focal point whereby an in-focus state is detected and adjusted in a wide range in a picture plane by setting a plurality of distance measuring visual fields. For instance, an in-focus state detecting apparatus for a single-lens reflex camera as shown in FIG. 6 has been proposed. In the apparatus, the light flux for AF which was reflected downwardly by a submirror SUBM enters a visual field mask VMSK having three different distance measuring visual fields through field lenses $FLD_1$, $FLD_2$, and $FLD_3$. After that, the AF light fluxes are transmitted via mirror reflecting members $M_1$ and $M_2$ to extend a length of optical path and enter a pair of image reforming lenses FCLA and FCLB and images are again formed onto the surfaces of the sensors. Three pairs of sensor arrays, that is, a pair of sensor arrays $SAA_1$ and $SAB_1$, a pair of sensor arrays $SAA_2$ and $SAB_2$, and a pair of sensor arrays $SAA_3$ and $SAB_3$ are used to individually receive the reformed optical images which derive from three visual fields of the visual field mask VMSK.

Even in such an AF apparatus for detecting in-focus states at a plurality of points in the picture plane, a method of controlling the sensors is the same as that in the conventional apparatus. The accumulating operations of all of the sensor pairs are started together and the accumulation control as mentioned above is executed for each sensor pair. There have been proposed several techniques with respect to a method whereby the AF arithmetic operations are executed from the sensors whose accumulating operations were finished and an in-focus state of the camera is obtained by applying an algorithm to a plurality of in-focus detection values. For instance, there is a method whereby among three distance measurement results, the result corresponding to the position which is closest to the camera is selected. The above method is based on the idea such that the main object exists at the nearest position and the images existing at relatively remote positions other than the main object are the background. There is also known a device for weighting in a manner such that the selection algorithm of the distance measuring points is changed in accordance with a focal point distance of the photographing lens and on the side of a short focal point, the selection of the central visual field is made easy or the like.

However, if the control of the multi-point AF sensors is executed by the conventional method, there are the following problems.

If the method of controlling the accumulation of the sensors as mentioned above is used, generally, in the case where there is a luminance difference in the picture plane of an object, the sensor output of the distance measuring point at which a portion of a low luminance is seen does not reach a predetermined level, so that the accumulation is not finished, a desired time of the AF operation becomes remarkably long, and the operability of the apparatus is ineffective.

On the other hand, a contrast constant control method has been known as a method of controlling the accumulation time. In this case, even in a space which is uniformly illuminated, contrasts of the light intensity distributions on the AF sensors differ depending on a pattern of an object, so that the accumulation times of the sensors having different distance measuring visual field differ. For instance, in the case of the sensor which observes a wall or a cloth of a solid color, even if the accumulating operation was executed for a long time, a contrast enough to reach a comparison level is not obtained. Therefore, even in a bright state, the maximum limit accumulating operation is soon performed. In the ordinary passive AF operation, it is necessary to execute a few sensor accumulating operations such as initial light reception of a light image, light reception of a light image for confirmation after the optical system was driven, confirmation after a fine correction in the case where an in-focus state is not derived as a result of the confirmation of the light image, and the like. If there is a sensor whose accumulation time is particularly long due to the causes as mentioned above, a time until the in-focus state is derived becomes remarkably long and the operability of the optical equipment is ineffective. Moreover, the distance measuring visual field which is seen by the sensor whose accumulation time is especially longer than those of the other sensors has an extremely low luminance and an extremely low contrast. Therefore, in many cases, an object to be photographed is not the main object. In other words, the operability is ineffective because of the distance measurement in which a possibility such that the result is eventually unnecessary is high.

SUMMARY OF THE INVENTION

The invention is made in consideration of the above circumstances and it is an object of the invention to improve a response speed of an apparatus for controlling accumulation times for a plurality of sensor means.

To accomplish the above object, according to an embodiment of the invention, there is provided an accumulation time control apparatus comprising a plurality of sensor means and control means for respectively controlling charge accumulation times in the sensor means, wherein on the basis of the accumulation time in either one of the sensor means whose accumulation amount has first reached a predetermined level, the control means sets the accumulation times of the other sensor means, and wherein each of the plurality of sensor means has a long photo sensitive surface which is extended in a predetermined direction for each distance measuring visual field and at least one of the sensor means has a photo sensitive surface which is extended in a direction different from the above predetermined direction.

According to the apparatus of the above embodiment, the whole accumulation time can be determined by the time which was required to first complete the accumulation. Therefore, for example, in the case of applying the invention to an AF apparatus, even in the case where either one of the distance measuring visual fields has extremely lower luminance and contrast than those of the other distance measuring visual fields, the delay of the AF operation by such a distance measuring visual field can be prevented. A response speed of such a kind of apparatus can be remarkably improved.

In the case where an object is so dark to be equal to or larger than a certain degree, an S/N ratio of the sensor output is not improved so long as the accumulation time is extended. Therefore, in such a case, no large influence is exerted on the AF accuracy even if the accumulation is stopped.

On the other hand, the photo sensitive surface of at least one of the sensor means includes a photo sensitive surface which extends in a direction different from the photo sensitive surfaces of the other sensor means, so that a dependency of the photo sensitive surface of the sensor means on the pattern can be reduced.

Further, by applying the invention to a plurality of sensor means such as in a 3-plate type camera, a degree of freedom of the time control which is required for the photoelectric conversion increases.

The above and other objects and features of the present invention will become apparent from the following detailed description and the appended claims with reference to the accompanying drawings.

DETAILED DESCRIPTION OF THE PREFERRED EMBODIMENTS

Embodiments of the invention will be described in detail hereinbelow with reference to FIGS. 7 to 9B.

Figure 7:
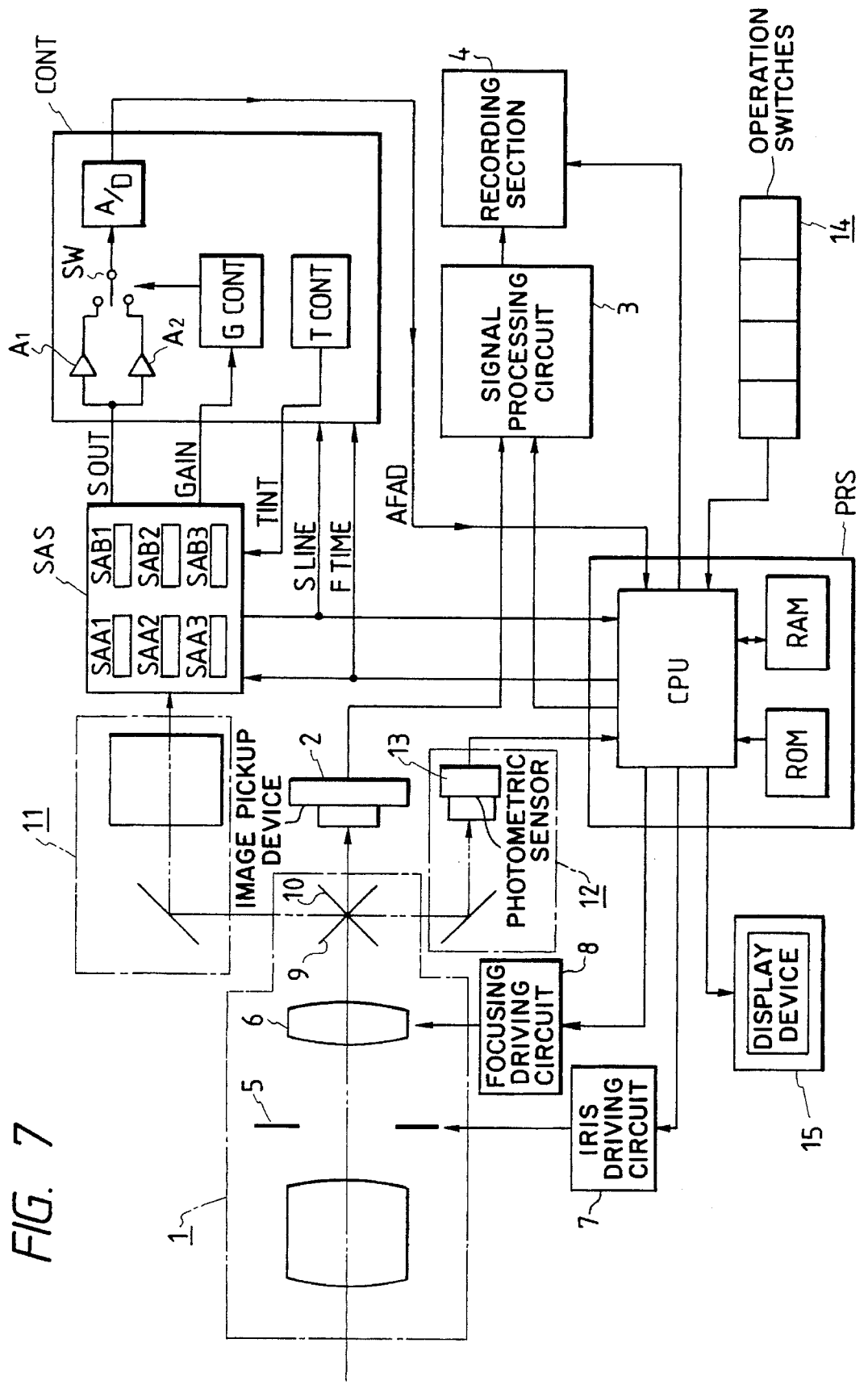
FIG. 7 is a block diagram showing a construction of an embodiment of a focal point detecting apparatus according to the invention.

FIG. 7 is a block diagram showing a construction of an electronic still camera according to an embodiment. According to the electronic still camera, an image pickup light from an object which was supplied through an image pickup optical system 1 is photoelectrically converted by an image pickup device 2 using a CCD or the like. An electric video signal obtained by the photoelectric conversion is processed by a signal processing circuit 3. After that, the video signal is recorded onto a recording medium such as a magnetic disk or the like by a recording section 4.

The image pickup optical system 1 has an iris 5 and a focusing lens 6. The iris 5 is driven by an iris driving circuit 7. The focusing lens 6 is driven by a focusing driving circuit 8.

Figure 6:
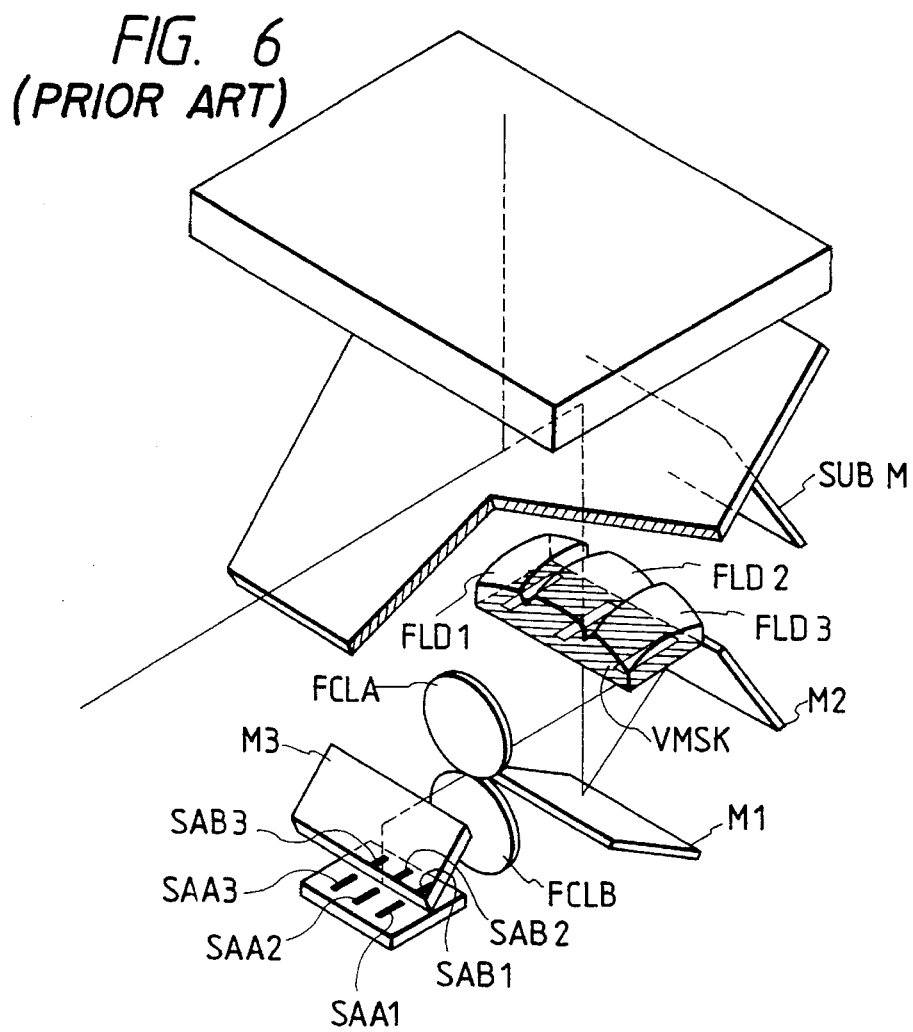
FIG. 6 is a diagram showing an optical system in a general multi-point focal point detecting apparatus.

Further, the image pickup lights which were reflected by mirrors 9 and 10 arranged on an optical axis of the image pickup optical system 1 are led to an AF optical system 11 and a photometric optical system 12, respectively. The image pickup light which was led to the AF optical system 11 is illuminated onto an AF sensor SAS through various optical devices as shown in FIG. 6. The image pickup light which was led to the photometric optical system 12 is illuminated onto a photometric sensor 13.

Further, the electronic still camera has: a control circuit CONT to control the AF sensor SAS; and a microprocessor PRS to control the control circuit CONT, AF sensor SAS, and the like. A CPU which constructs the microprocessor PRS controls the signal processing circuit 3 and the recording section 4 in accordance with the operations of various operation switches 14. Further, the CPU supplies an iris control signal according to a photometric output of the photometric sensor 13 to the iris driving circuit 7. The CPU also supplies a focusing control signal according to an output of the AF sensor SAS which is supplied through the control circuit CONT to the focusing driving circuit 8.

An operating mode and the like of the camera are displayed by a display device 15 using a liquid crystal or the like.

The microprocessor PRS comprises a CPU, a ROM, and a RAM. The CPU properly reads out and executes various program data stored in the ROM in accordance with the operations of the switches and controls the writing and reading operations of the various data which are supplied in association with the execution of the program into and from the RAM.

The AF sensor SAS has three pairs of sensors. The AF light fluxes are irradiated to a pair of sensors $SAA_1$ and $SAB_1$, a pair of sensors $SAA_2$ and $SAB_2$, and a pair of sensors $SAA_3$ and $SAB_3$ through the field lenses $FLD_1$ to $FLD_3$ and the visual field mask VMSK of the AF image pickup system shown in FIG. 6. Outputs of the sensors are used as control outputs. The control outputs can be also derived from control sensors. The control circuit CONT comprises: analog amplifiers $A_1$ and $A_2$ to amplify the output of the sensor SAS by different predetermined gains, respectively; a switching circuit SW to selectively supply outputs of the analog amplifiers to an A/D converter; a gain control circuit GCONT to substantially switch the gains for the outputs of the analog amplifiers by switching and controlling the switching circuit SW in accordance with an output level of the sensor SAS; and a timing control circuit TCONT to control the timings to start or stop the accumulation of the sensor SAS.

The control circuit CONT and the microprocessor in the embodiment can be also obviously constructed by a one-chip microcomputer.

Figure 8:
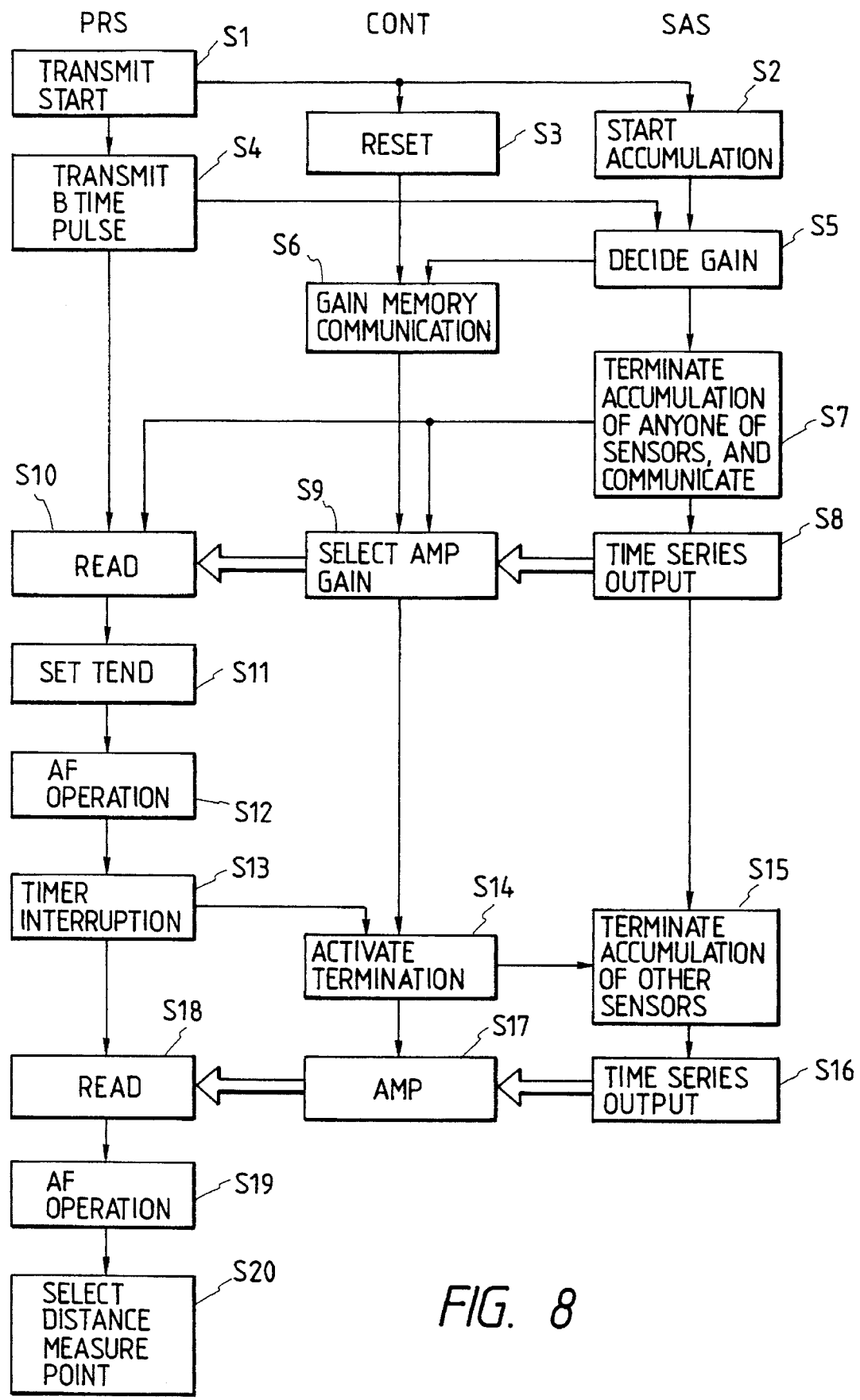
FIG. 8 is a flowchart showing an operating state of the apparatus of FIG. 7.

FIG. 8 is a flowchart showing the operation of the first embodiment of the invention. The operation will now be described hereinbelow.

Figure 1:
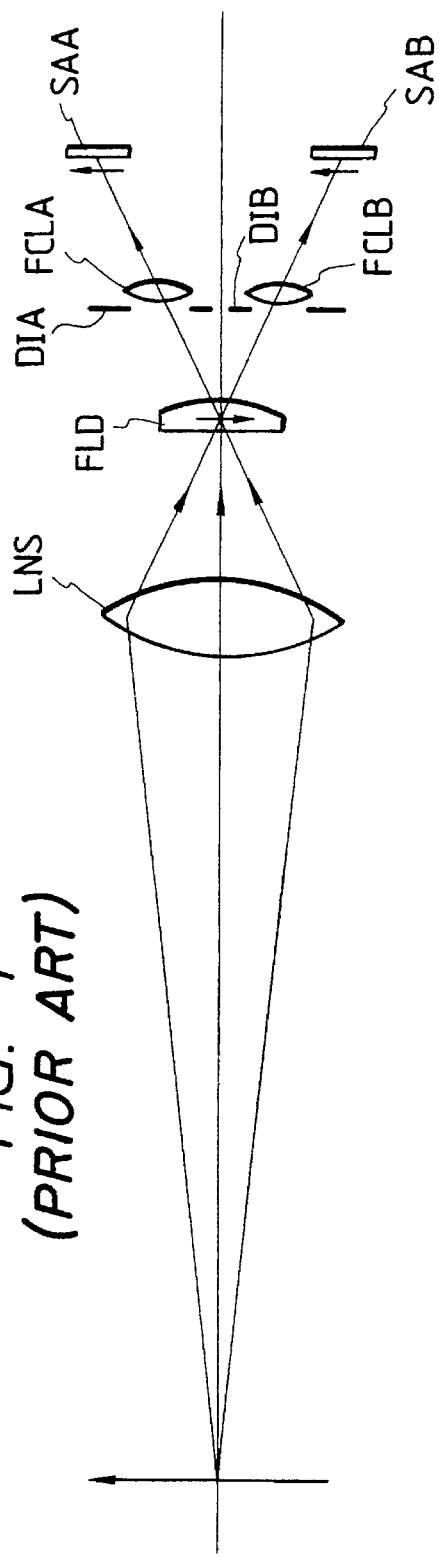
FIG. 1 is an optical path diagram showing an optical system in a general double image phase difference detecting system.
Figure 2:
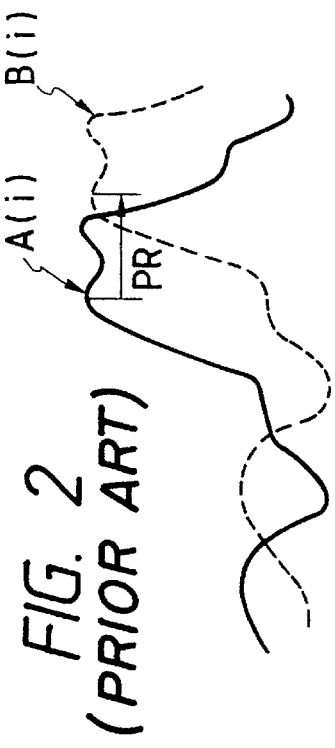
FIG. 2 is a waveform diagram showing an output waveform from each sensor of the optical system shown in FIG. 1 and a deviation amount.
Figure 3:
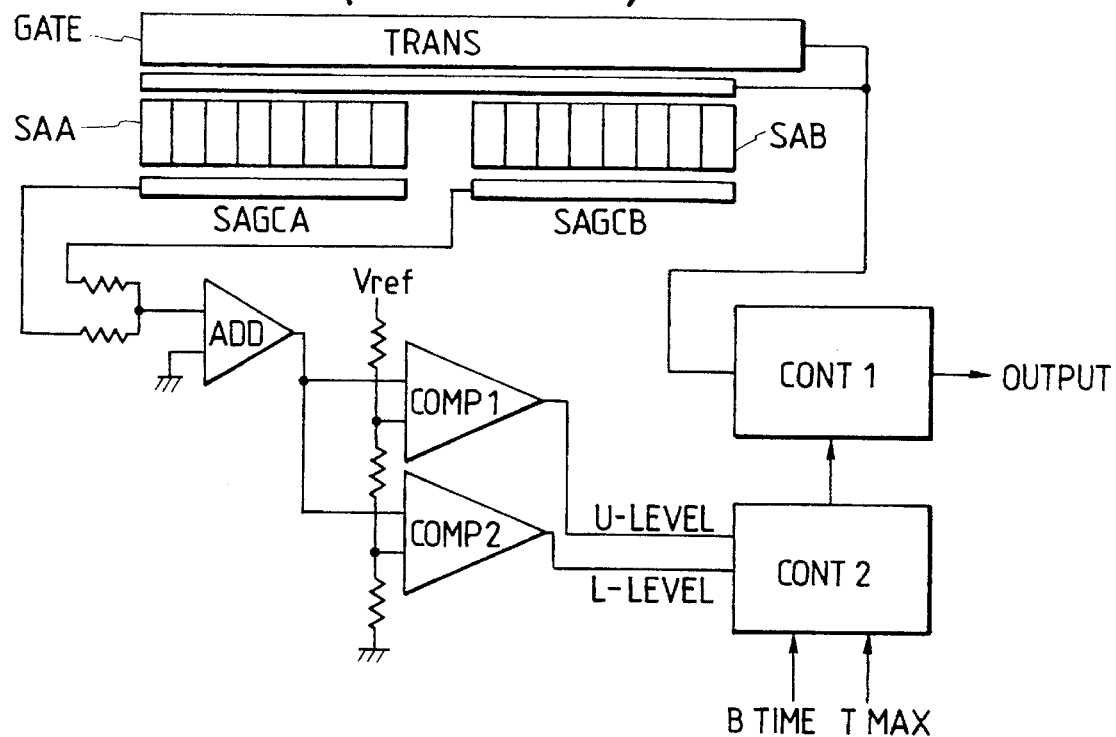
FIG. 3 is a block diagram showing a construction of a conventional sensor driving circuit.
Figure 4:
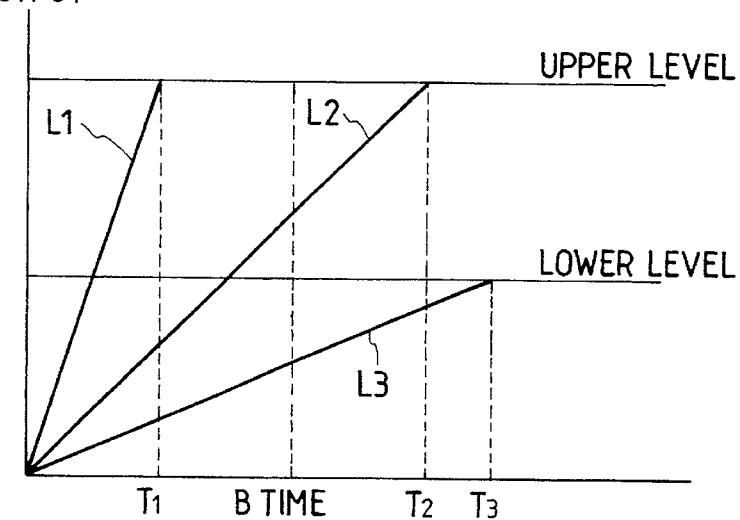
FIG. 4 is a graph showing the relation between an accumulation time and a sensor output.
Figure 5:
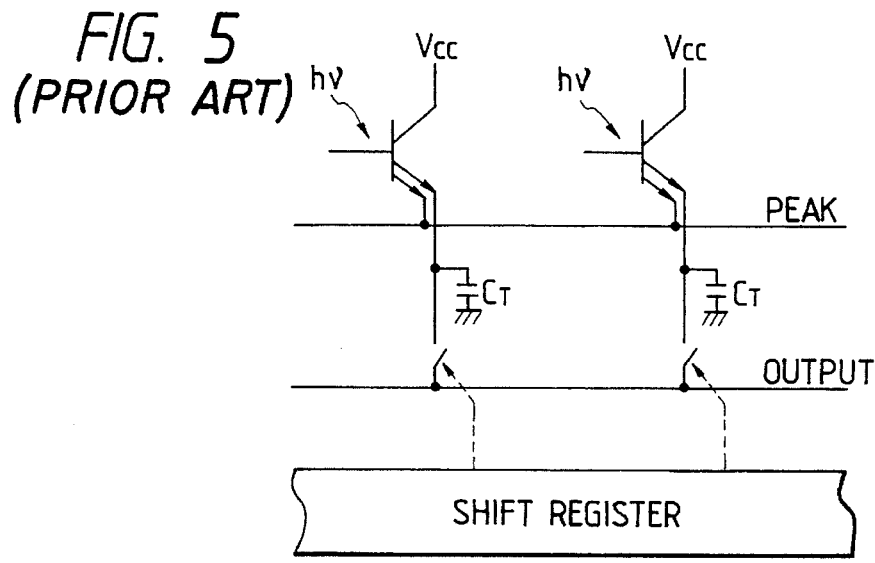
FIG. 5 is a circuit diagram showing an image forming construction of a transistor to amplify the sensor output.

The microprocessor PRS sends an accumulation start signal START to the AF sensor through a data communication path FTIME regarding the timings at the start of the AF sequence after the iris was adjusted (step S1), thereby starting the accumulation of the sensor SAS (step S2). The microprocessor PRS also resets the control circuit CONT into the initial state (step S3). After completion of the accumulation for a period of about 10 to 20 msec, the microprocessor PRS supplies a pulse BTIME to the sensor through the line FTIME for a gain decision time in accordance with the content of the program (step S4). Upon reception of the pulse BTIME, each of the three sensor array pairs in the sensor SAS determines an accumulation termination level to either the upper level or the lower level on the basis of the foregoing method of FIG. 4 (step S5). The accumulation termination level (corresponding to the selected amplifier gain upon reading) of each sensor array pair is supplied through a line GAIN to the gain control circuit GCONT and stored (step S6). Among the three sensor array pairs, for instance, if a charge accumulation amount of the pair of sensors $SAA_1$ and $SAB_1$ has first reached the accumulation termination level, the sensor SAS communicates an ID signal of such a pair of sensor array whose accumulation was finished to the microprocessor PRS and the control circuit CONT through a line SLINE (step S7). The sensor SAS also time sequentially generates an image signal from a terminal SCUT in response to a clock signal (not shown) (step S8). Further, a proper one of the gains of the analog amplifiers $A_1$ and $A_2$ having different predetermined gains is selected on the basis of the designated gain stored in the gain control circuit GCONT (step S9). The output of the sensor SAS is amplified and A/D converted and sent as digital data to the microprocessor PRS.

The microprocessor PRS reads a signal on the line SLINE before one AF focal point of the distance measuring visual field is calculated from the output signals of the sensor array pair $SAA_1$ and $SAB_1$ (step S10). An accumulation time $TINT_1$ of the pair of sensors $SAA_1$ and $SAB_1$ is calculated at the reading timing of the SLINE signal, a forced accumulation end time of each of the other sensors $$T_{end} = K \times TINT_1 \qquad (1)$$

is calculated, and a programmable timer (not shown) in the microprocessor PRS is set so as to generate a timer interruption for such a forced accumulation termination time (step S11). After that, one AF focal point of the distance measuring visual field is calculated on the basis of the output signals of the sensor array pair $SAA_1$ and $SAB_1$ (step S12). After that, the calculated AF focal point is stored.

When the timer interruption is generated by the program timer (step S13), a program to forcibly terminate the accumulating operation of the other sensor array which is executing the accumulation even if a charge accumulation amount of such a sensor array doesn't reach the accumulation end level is activated (step S14). A forced end signal is sent to the line FTIME. Upon reception of the forced end signal, the timing control circuit TCONT sends an accumulation end control signal TINT to the sensor SAS, thereby finishing the accumulating operation (step S15). If the accumulation level of the other line of the sensor array has reached a predetermined end level for a period of time between $TINT_1$ and $T_{end}$, the termination of the accumulation, the signal transmission, the calculation of the AF focal point, and the like are executed in accordance with the ordinary control sequence (steps S16 to S19). After that, the optimum distance measuring point is selected from the AF operation outputs (step S20).

The AF operation output at the distance measuring point is supplied to the AF circuit and the AF lens is moved.

If $T_{end}$ (=$K \times TINT_1$) which was set in step S10 is longer than a maximum accumulation permission time TMAX, an accumulation end pulse is sent to the line FTIME at the time TMAX. The accumulation of the sensor array which is executing the accumulating operation is finished by the above requirement.

By controlling the accumulation time of each sensor array pair by the above method, the operating times of the sensors in the case where the luminance differences among the distance measuring points are large and there is a remarkably large variation among the accumulation times in the conventional method can be suppressed to a constant time ($T_{end}$). Thus, a desired time of the whole AF sequence is reduced and the operability of the AF camera is improved.

It has been found from experiments that a magnification coefficient K is properly set to a value within a range of $1 < K \leq 8$, preferably, $1 < K \leq 4$. If the value of K is too large, an effect to reduce the accumulation time is not obtained. If it is too small, there is a tendency such that a priority is eventually given to a high luminance and a high contrast.

In the above embodiment, the accumulating operations of the other sensor arrays are finished at the time which is K times as long as the accumulation time $TINT_1$ of the sensor array whose accumulating operation was first finished. As a modification, it is also possible to construct the apparatus in a manner such that the forced termination of the accumulating operations of the other sensors is activated only when the result of the AF operation after completion of the accumulation indicates that an in-focus state can be detected. For instance, in the case where a bright sky, a direct reflected light of the sun, or the like entered a certain visual field, the accumulation is finished in an extremely short time in spite of the fact that an input signal is meaningless and a distance cannot be measured. Therefore, the accumulation is finished before charges are accumulated into the other sensor array in a visual field which is seeing a main object until a meaningful signal level. Therefore, only when the input signal is a signal having a high reliability in which an in-focus state can be detected as a result of the discrimination, is the accumulation time of such a sensor array used as $TINT_1$ in the above equation (1). If a sufficient high speed microcomputer is used, the control delay time can be ignored because a time which is required for the operation and discrimination is short.

In the embodiment, it is desirable to add a shortest time limitation to the time for activating the accumulation forced end timer and to forcibly finish the accumulation only in the case where such a time is equal to or longer than a predetermined time. This is because since the invention intends to improve the operability of the apparatus such as a camera or the like, even if the accumulation times of the sensor arrays at different distance measuring points remarkably differ, there is no need to limit the accumulation time so long as the accumulation time as an absolute amount is short. For instance, when the sensor array pair $SAA_1$ and $SAB_1$ finishes the accumulation for 1 msec, there is no need to forcibly finish the accumulating operations of the other sensors at a time of $T_{end} = K \times 1$ msec. Since a human being can feel the delay of the AF operation when it is equal to or longer than 100 msec due to five senses of the human being, it is ineffective to limit the accumulation by a time which is too much shorter than 100 msec and the AF performance is deteriorated.

Therefore, it is preferable to provide a set lower limit value for the forced end timer. It has been found by experiments that the set lower limit value is set to a value within a range from 20 to 200 msec, preferably, about 40 to 160 msec. Since the accumulating operations of a few times are required until the photographing lens is set to an in-focus state, if the above lower limit value is set to a long time, the effect of the invention decreases.

(Other embodiments)

Figure 9A:
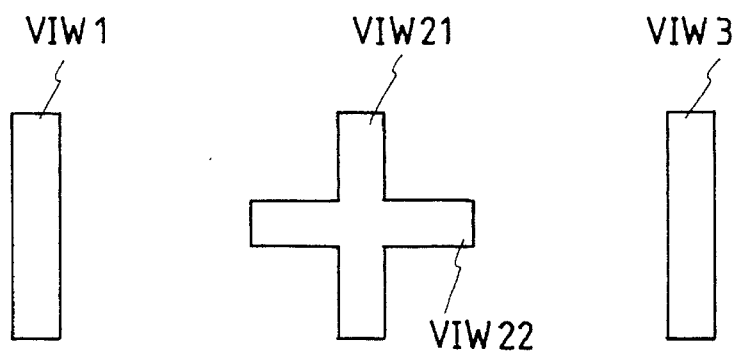
FIGS. 9A and 9B are schematic diagrams showing a pattern of visual field masks and an arrangement of sensors which are used in another embodiment of the invention.
Figure 9B:
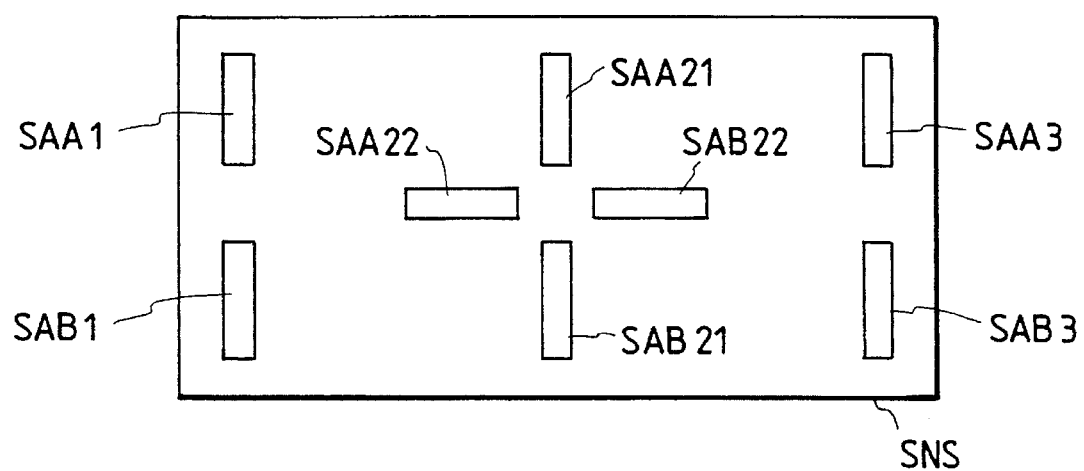

Another embodiment of the invention will be described with reference to FIG. 9. FIG. 9A shows an arrangement of a distance measuring visual field of the AF system of the embodiment. That is, a lateral visual field $VIW_{22}$ of a distance measuring visual field of the central portion is added to the foregoing embodiment. The lateral visual field $VIW_{22}$ is used to improve a dependency on a pattern. If only a visual field in the vertical direction is used, the AF system cannot respond to a pattern such as a vertical line. Therefore, the lateral visual field $VIW_{22}$ which crosses perpendicularly to a visual field $VIW_{21}$ in the vertical direction is provided, thereby eliminating a merit and a demerit of an object depending on the direction of a pattern. Since means of obtaining a distance measuring visual field arrangement as shown in the diagram is well known, its detailed description is omitted. For instance, an optical method of perpendicularly arranging the central visual fields $VIW_{21}$ and $VIW_{22}$ can be realized by arranging four image reforming lenses in a crossing (+) shape. It is sufficient to also provide two AF systems in each of which a pair of two image reforming lenses are provided and which have hitherto frequently been used. With the above construction, a sensor arrangement shown in FIG. 9B is derived. That is,

- a sensor array pair $SAA_1$ and $SAB_1$ is arranged in correspondence to a distance measuring visual field $VIW_1$,
- a sensor array pair $SAA_{21}$ and $SAB_{21}$ is arranged in correspondence to the distance measuring visual field $VIW_{21}$,
- a sensor array pair $SAA_{22}$ and $SAB_{22}$ is arranged in correspondence to the distance measuring visual field $VIW_{22}$, and
- a sensor array pair $SAA_3$ and $SAB_3$ is arranged in correspondence to a distance measuring visual field $VIW_3$, respectively.

The accumulation times of the above four pairs of sensor arrays are controlled in the following manner. First, light amount distributions of the two central distance measuring visual fields $VIW_1$ and $VIW_{22}$ are received. When the accumulating operations are limited with respect to the sensor array pair of $SAA_{21}$ and $SAB_{21}$ and the sensor array pair of $SAA_{22}$ and $SAB_{22}$, the value of K in the equation (1) is set to a small value within a range from 1 to 4, preferably, from 1 to 2, thereby controlling the accumulation. On the other hand, upon control of the accumulation between the right and left sensors and the accumulation between the central sensors, K is set to a value within a range from 1 to 8, preferably, from 2 to 4 in the equation (1) in a manner similar to that in the foregoing embodiment.

The reason why K is set to such a value will now be described hereinbelow.

For two visual fields $VIW_{21}$ and $VIW_{22}$, since the same position of an object is seen in the scanning directions which cross perpendicularly, it is sufficient to obtain the light amount distribution information in one of the two visual fields which is more suitable for the AF operation. When the accumulation is finished on the basis of the comparison level, if a control to set the peak value to be constant is executed, the accumulation level of either one of the two visual fields $VIW_{21}$ and $VIW_{22}$ which includes higher luminance information first arrives at the comparison level and the accumulating operation is finished. On the other hand, if a control to set a contrast to be constant is executed, the visual field of a higher contrast between the two visual fields first finishes the accumulating operation. Even if any one of the above two controlling methods is used, the visual field which earlier finishes the accumulation has information suitable for the AF operation. Since such information relates to the same position of the object, it is advantageous for the system to also finish the accumulation of the array in the other perpendicular direction as quickly as possible in accordance with the operation of the AF sensor array of the better visual field which first finishes the accumulation.

Therefore, in the embodiment, the value of K in the equation (1) is changed and applied between the two central visual fields $VIW_{21}$ and $VIW_{22}$ and among three points of the left, right, and center positions, and it is desirable to use a small value in the case of between the two central visual fields and to use a relatively large value similarly to the foregoing embodiment in the case among the three left, right, and center points. When the accumulation is forcibly finished among the three right, left, and center points, if the sensor array which sees either one of the vertical and lateral visual fields in the central portion first finished the accumulation, the accumulating operations of the right and left sensors are limited on the basis of the accumulation time of such a sensor array which first finished the accumulation. On the other hand, in the case where one of the sensor arrays which sees the left and right visual fields $VIW_1$ and $VIW_3$ first finished the accumulation, the accumulating operations to the two central visual fields are simultaneously limited in the vertical and lateral directions.

In addition to a condition such that the AF detection can be performed by using the accumulation end signal as well as the termination of the accumulation in the embodiment, the accumulation times of the other sensors can be also obviously controlled by the AF detection.

The invention can be also applied to an AF apparatus which is constructed by extracting only the systems of two visual fields in the central, vertical, and lateral directions in the embodiment. The invention is not always limited to two visual fields which cross perpendicularly. The above method is effective in a visual field construction such as to substantially scan the same position of an object in different directions.

In the above embodiment, the invention has been applied to a multipoint AF apparatus. However, the invention can be also obviously applied to the control of the accumulation time of each sensor output of a multiplate type camera.

As described above, by using the accumulation time control method of the AF sensor arrays according to the embodiment, the operating speed of the AF apparatus having a plurality of distance measuring visual fields can be remarkably improved and the operation of various apparatuses such as a camera and the like can be improved.

I claim:

1. An accumulation time control apparatus comprising:

a plurality of sensor means for receiving image pickup light from an object, each sensor means having associated with the respective sensor means monitor means for monitoring brightness of the image pickup light received by the respective sensor means; and control means for starting a charge accumulation operation of said plurality of sensor means simultaneously and for controlling charge accumulation times of said sensor means, respectively, on the basis of signals output from said monitor means, wherein the control means detects the accumulation time of one of the sensor means whose accumulation amount has first reached a predetermined level, and the control means terminates an accumulation operation of the other sensor means on the basis of the detected accumulation time of said one of said sensor means.

2. An apparatus according to claim 1, wherein said plurality of sensor means have long photo sensitive surfaces which are extended in a predetermined direction for each of a distance measuring visual field, and at least one of the sensor means has a photo sensitive surface which is extended in a direction different from said predetermined direction.

3. An apparatus according to claim 1, wherein said plurality of sensor means photoelectrically convert image pickup lights of different portions of a same object.

4. An apparatus according to claim 1, wherein the control means includes a microcomputer.

5. An apparatus according to claim 1, wherein the control means includes setting means for setting said predetermined level.

6. An apparatus according to claim 5, wherein the setting means sets said predetermined level in accordance with an output of each of said sensor means.

7. An image pickup apparatus comprising:

(a) a plurality of sensor means for receiving image pickup light from an object, each sensor means having associated with the respective sensor means monitor means for monitoring brightness of the image pickup light received by the respective sensor means;

(b) accumulation terminating means, connected to receive output signals from the respective monitor means, for simultaneously starting respective charge accumulation operations of said plurality of sensor means, for terminating the respective accumulation operation of a first one of said plurality of sensor means in response to the output signal of the monitor means associated with said first sensor means, and for terminating the accumulation operation of a second one of said plurality of sensor means in response to said termination of the accumulation operation of said first sensor means; and (c) control means for receiving an output signal from at least one of said sensor means and for performing an automatic focusing control operation by controlling a position of a lens system on the basis of said output signal from said at least one of said sensor means.

8. An apparatus according to claim 7, wherein said accumulation terminating means and said control means include a single microcomputer.

9. An apparatus according to claim 7, further having;

(d) an optical system to lead the image pickup light from the object; and (e) image pickup means for obtaining a video signal by photoelectrically converting the image pickup light which is supplied through the optical system.

10. An apparatus according to claim 9, wherein the optical system includes a focusing lens.

11. An apparatus according to claim 9, wherein the image pickup means includes a CCD.

12. An apparatus according to claim 7, wherein the optical system also leads the image pickup light to the sensor means.

13. An apparatus according to claim 7, wherein the plurality of sensor means photoelectrically convert image pickup lights of different portions of the same object.

14. An apparatus according to claim 7, wherein said plurality of sensor means have long photo sensitive surfaces which are extended in a predetermined direction for each of a distance measuring visual field, and at least one of the sensor means has a photo sensitive surface which is extended in a direction different from said predetermined direction.

15. An apparatus according to claim 7, wherein the control means includes a microcomputer.

16. An accumulation time control apparatus comprising:

a plurality of sensors for receiving image pickup light from an object, each sensor having associated with the respective sensor monitor means for monitoring brightness of the image pickup light received by the respective sensor; and control means for starting a charge accumulation operation of said plurality of sensors simultaneously and for controlling respective charge accumulation periods of said plurality of sensors on the basis of signals output from said monitor means, said control means terminating the respective accumulation operation for a first sensor in said plurality in response to termination of the accumulation operation of a second sensor in said plurality.

17. An apparatus according to claim 16, wherein said plurality of sensors have long photo sensitive surfaces which are extended in a predetermined direction for each of distance measuring visual fields, and at least one of the sensors has a photo sensitive surface which is extended in a direction different from predetermined direction.

18. An apparatus according to claim 16, wherein said plurality of sensors photoelectrically convert image pickup lights of different portions of a same object.

19. An apparatus according to claim 16, wherein the control means includes a microcomputer.

20. An apparatus according to claim 16, wherein the control means includes setting means for setting said predetermined level.

21. An apparatus according to claim 20, wherein the setting means sets said predetermined level in accordance with an output of each of said sensors.

22. Accumulation time control apparatus comprising:

(a) a plurality of sensor means for receiving image pickup light from an object, each sensor means having associated with the respective sensor means monitor means for monitoring brightness of the image pickup light received by the respective sensor means;

(b) detection means for monitoring respective outputs of said monitor means and detecting that one of said outputs reaches a predetermined level; and (c) control means for terminating an accumulation operation of all of said plurality of sensor means on the basis of an output of said detection means after simultaneously starting charge accumulation operation of said plurality of sensor means.

23. An apparatus according to claim 22, wherein said plurality of sensor means have long photo sensitive surfaces which are extended in a predetermined direction for each of distance measuring visual fields, and at least one of the sensor means has a photo sensitive surface which is extended in a direction different from said predetermined direction.

24. An apparatus according to claim 22, wherein said plurality of sensor means photoelectrically convert image pickup lights of different portions of a same object.

25. An apparatus according to claim 22, wherein the control means includes a microcomputer.

26. An apparatus according to claim 22, wherein the control means includes setting means for setting said predetermined level.

27. An apparatus according to claim 26, wherein the setting means sets said predetermined level in accordance with an output of each of said sensor means.

28. An apparatus according to claim 1, wherein each of said plurality of sensor means includes a plurality of photoelectric conversion cells for picking up an image.

29. An apparatus according to claim 28, wherein said monitor means includes photoelectric conversion means which is different from said photoelectric conversion cells.

30. An apparatus according to claim 28, wherein said monitor means includes means for detecting a level of a signal outputted from said photoelectric conversion cells.

31. An apparatus according to claim 7, wherein each of said plurality of sensor means includes a plurality of photoelectric conversion cells for picking up an image.

32. An apparatus according to claim 31, wherein said monitor means includes photoelectric conversion means which is different from said photoelectric conversion cells.

33. An apparatus according to claim 31, wherein said monitor means includes means for detecting a level of a signal outputted from said photoelectric conversion cells.

34. An apparatus according to claim 16, wherein each of said plurality of sensors includes a plurality of photoelectric conversion cells for picking up an image.

35. An apparatus according to claim 34, wherein said monitor means includes photoelectric conversion means which is different from said photoelectric conversion cells.

36. An apparatus according to claim 34, wherein said monitor means includes means for detecting a level of a signal outputted from said photoelectric conversion cells.

37. An apparatus according to claim 22, wherein each of said plurality of sensor means includes a plurality of photoelectric conversion cells for picking up an image.

38. An apparatus according to claim 37, wherein said monitor means includes photoelectric conversion means which is different from said photoelectric conversion cells.

39. An apparatus according to claim 37, wherein said monitor means includes means for detecting a level of a signal outputted from said photoelectric conversion cells.

40. An accumulation time control apparatus comprising:

a plurality of sensors, including a first sensor and a second sensor; and control means, operatively connected to said plurality of sensors, for simultaneously starting respective charge accumulation operations of said plurality of sensors, said control means detecting a first time point at which said first sensor stops its respective accumulation operation, said control means also setting, on the basis of said detected first time point, a second time point later than said first time point and said control means stopping the respective accumulation operation of said second sensor at said second time point.

* * * * *

UNITED STATES PATENT AND TRADEMARK OFFICE
CERTIFICATE OF CORRECTION

PATENT NO. : 5,594,501
DATED : January 14, 1997
INVENTOR(S) : Kenji Suzuki

It is certified that error appears in the above-identified patent and that said Letters Patent is hereby corrected as shown below:

Col. 7, line 12, delete "SCUT" and insert -- SOUT --.

Signed and Sealed this

Twenty-eighth Day of April, 1998

*Attest:*

BRUCE LEHMAN

*Attesting Officer*  Commissioner of Patents and Trademarks